Patented Oct. 25, 1932

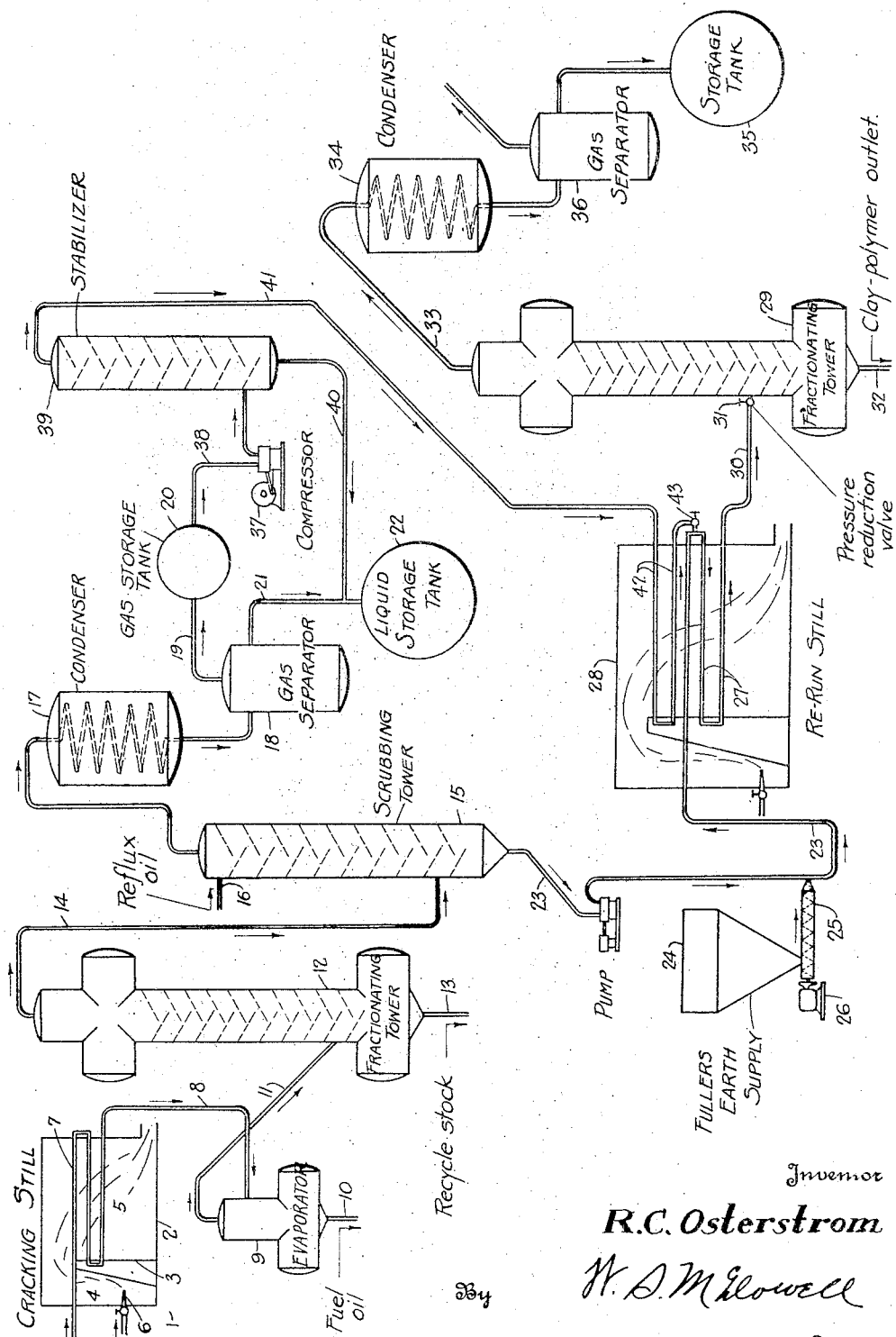

1,884,163

UNITED STATES PATENT OFFICE

RUDOLPH C. OSTERSTROM, OF CHICAGO, ILLINOIS, ASSIGNOR TO THE PURE OIL COMPANY, OF CHICAGO, ILLINOIS, A CORPORATION OF ILLINOIS

PROCESS OF TREATING HYDROCARBONS

Application filed April 17, 1929. Serial No. 355,693.

This invention has to do particularly with the treatment of hydrocarbon distillates and gases obtained from cracking stills, especially those stills wherein the oil undergoing cracking reactions is maintained in the vapor phase and subjected to cracking temperatures in excess of 900° F. In such cracking operation distillates are obtained having boiling points corresponding to those of gasoline and which possess certain advantages over ordinary gasoline when employed as motor fuels. It is well understood, however, that vapor phase systems of cracking produce relatively greater quantities of gas than obtains when the hydrocarbons are cracked in the so-called "liquid phase". Therefore, since gas under ordinary conditions possesses slight economic value, it is customary, after a certain amount of treatment, to employ the same as fuel in heating the stills of the process.

It is therefore an outstanding object of the present invention to provide for the re-introduction of the gas into the system for the purpose of subjecting the gas to polymerization conditions, in order to produce compounds therefrom of higher molecular weights and which upon being condensed are also suitable for use as motor fuels.

In the treatment of distillates obtained from vapor phase cracking stills, and which distillates possess a high degree of unsaturated compounds, color-imparting and gum-forming compounds are removable therefrom by passing the distillates, together with fuller's earth, through a heating zone wherein the distillates are subjected to temperatures and pressures while in the presence of the fuller's earth, which effect polymerization of the undesirable compounds, such as color and gum-forming bodies, from the distillates, leaving the latter in a purified or treated condition suitable for commercial distribution and use.

I have discovered that by taking the gases from a cracking or treating system of this character and passing the same through the heating zone which, as above stated, is employed primarily for effecting polymerization of undesired color and gum-forming bodies in the distillate, such gases are also subjected in said heating zone to polymerization influences, producing therein bodies of higher molecular weights which can be subsequently reduced to motor fuel spirit. Thus, in accordance with the present invention, in the polymerization zone there take place reactions whereby color and gum-forming bodies are removed from the oils under treatment and, second, polymerization reactions in the so-called "fixed" gas re-introduced into the system to minimize the final quantity of gas released from the system and to secure a maximum quantity of the desired liquid end product having the boiling range substantially of ordinary gasoline.

For a further understanding of the process reference is to be had to the following description and to the accompanying drawing wherein the figure represents diagrammatically a view of the apparatus used in carrying into effect one of the preferred applications of the invention.

Referring more particularly to the drawing, the numeral 1 designates a cracking still which is formed to comprise a setting 2 having arranged therein a transverse bridge wall 3 which divides the setting into combustion and tube chambers 4 and 5 respectively. Arranged within the combustion chamber is one or more burners 6 by which the desired internal temperature of the still is maintained. Disposed within the tube chamber of the still is a coil 7 through which oil under process of conversion or cracking is continuously forced or passed. The internal temperature of the still is such as to heat the oil passing through the coil 7 to a temperature usually in excess of 900° F., although, of course, the invention in its broader aspects also has application to cracking systems wherein somewhat lower cracking temperatures are utilized.

Following the heating of the oil in the converter or still 1 wherein a desired cracking thereof takes place, the vapors are discharged from the outlet end of the coil by way of a pipe line 8 which leads to an evaporator 9. In this evaporator there takes place a rough separation of the vapors from the liquid oil remaining in the system after cracking, such liquid oil being removed from the evaporator by way of the pipe line 10 ordinarily as fuel oil.

The vapors are passed overhead from the evaporator and forced through a pipe line 11 and lead into the bottom of a fractionating tower 12. This tower functions as usual to separate high boiling point compounds from those of lower boiling points, the high boiling compounds being cracked as liquids in the bottom of the fractionating tower and may be withdrawn by way of the pipe line 13 as recycle stock and adapted for recirculation through the cracking still. The vapor outlet of the fractionating tower is connected with a pipe line 14 which leads to the bottom of a scrubbing tower 15. Reflux oil may be introduced into the top of this tower as at 16 in order to flow in countercurrent relation to the ascending vapors passing through the scrubbing tower for the purpose of condensing and removing from such vapor entrained high boiling compounds.

The vapors which pass overhead from the scrubbing tower 15 are forced through a cooler or condenser 17 which is maintained at suitable temperatures to liquefy all portions of the oil stock flowing therethrough except the fixed gas or other materials which are not liquid at ordinary temperatures. Following passage through the condenser 17 the materials pass into a gas separator 18 from which the fixed gases are removed by way of the pipe line 19 which leads to a gas storage tank 20. The liquids which flow from the separator 18 through the pipe line 21 are lead to a liquid storage tank 22 as finished motor fuel.

The liquid fractions which collect in the bottom of the scrubbing tower 15 usually require additional treatment before they are suitable for use as a commercial motor fuel product. Usually this liquid fraction which collects in the bottom of the scrubbing tower contains a large percentage of unsaturated compounds which, in turn, possess undesirable elements which tend to discolor and produce gum formation in the finished oil. It is necessary therefore to treat this fraction of the oil to remove therefrom in the most economical and effective manner the color-imparting and gum-forming bodies, and to do this in such manner that the desired constituents will be affected as little as possible and with but minimum loss during such treatment.

This is accomplished in the preferred form of my invention by introducing into the pipe line 23 leaving the bottom of the scrubbing tower 15 regulated quantities of a contact or catalytic material such as fuller's earth. Another method of accomplishing this resides in placing the fuller's earth in a magazine 24 with which is connected a motor driven worm conveyor 25, whereby the oil as it is forced through the line 23 by a pump 26 is thoroughly intermingled with the fuller's earth or other diatomaceous clays. After being so intermingled with fuller's earth the liquid oil is then forced by the pump 26 through a bank of heating tubes 27 arranged in a so-called re-run still 28, wherein the oil is vaporized by being heated to temperatures of from between 500 to 900° F. while maintained under pressures of from 300 to 700 pounds per square inch. The re-run still provides a polymerization zone wherein under the conditions recited the undesirable compounds within the oil are polymerized to form heavy high boiling point fractions which may be separated readily from the lower boiling point desired fractions.

The outlet of the still 28 is connected with a fractionating tower 29 and in the pipe line 30 between the still 28 and the tower 29 there is arranged a pressure reduction valve 31 which is operable to permit relatively low pressures to obtain in the tower 29 as regards the pressures which exist in the tubes 27 of the re-run still 28. Due to the reduced pressures in the tower 29 there takes place an instant separation of the vaporous or lighter compounds from the heavy, high boiling point compounds, the latter, together with the clay, being collected in liquid form in the bottom of the tower 29 and discharged through a pipe line 32. The purified and treated vapors pass upwardly through the tower 29 and flow by way of a pipe line 33 through a cooler or condenser 34 and thence to a storage tank 35. The oil collects in liquid form in the tank 35 and is suitable for use as finished motor fuel. A gas separator 36 is disposed between the condenser 34 and the tank 35 to admit of the release of the remaining uncondensibles from the system and to permit such uncondensibles to be employed for fuel purposes if desired, or circulated back to the system for re-processing.

The gas which collects in the tank 20 may be lead to a compressor 37 by the pipe line 38, wherein the gases are subjected to high pressures necessary to secure condensation of the liquefiable constituents thereof. This is a common expedient in the operation of oil cracking plants, although heretofore the gases discharged from the compressor, corresponding to the compressor 37, have been collected mainly for use as a fuel. In accordance with the present invention, however, the oils both liquid and gaseous released from the compressor 37 are passed to a stabilizing tower 39 wherein there takes place separation of the liquefiable from the gaseous constituents, the liquefiable fractions being returned by the pipe line 40 to the tank 20, while the gases which pass overhead from the tower 39 are taken by way of a pipe line 41 to a bank of tubes 42 arranged in the re-run still 28. Within the tubes 42 the gases are heated to desired temperature and then by way of the valve connections 43 are introduced into the tubes 27 arranged in the re-run still for commingling with the oil vapors passing through the tubes 27 and carrying fuller's earth or other catalytic or contact materials. It will be seen that by heating the gases the latter will be at approximately the temperature of the oils passing through the tubes 27 so as to avoid undesired cooling of the oils in the tubes 27. Thus the fixed gases are subjected to the polymerization conditions which obtain in the re-run still 28, whereby the latter still is employed to effect polymerization first of the undesirable compounds, such as gum-forming and color-imparting bodies in the liquid fraction obtained from the scrubbing tower 15, and, second, polymerization of the gases removed from the compressor 37. These gases through polymerization are rearranged molecularly to produce compounds of higher boiling points, which pass into the tower 29 and are collected subsequently in the tank 35 as motor fuel. The gases which are not polymerized or affected by the conditions in the still 28 may be removed from the system through the separator 36.

Thus the present invention provides a method of treating cracked distillates whereby a maximum quantity of a desired liquefiable end product or products is obtained, the undesirable compounds removed from the oils undergoing treatment and gas formation and losses maintained at a minimum.

What is claimed is:

1. The method of treating cracked low-boiling unsaturated hydrocarbons, which consists in passing such hydrocarbons from a cracking zone through a fractionating stage to separate as vapors a fraction composed of the more-volatile hydrocarbons from a less-volatile liquid fraction, condensing and collecting the volatile fraction and removing therefrom the uncondensed gaseous hydrocarbons, passing the higher boiling less volatile liquid fraction through a heating stage and therein subjecting such liquid fraction to controlled conditions of temperature and pressure to produce without material molecular decomposition thereof polymerization of undesired gum-forming and color-imparting bodies present in said liquid fraction, simultaneously passing through said heating stage a portion, at least, of said gaseous hydrocarbons and subjecting them without material cracking to the controlled conditions of temperature and pressure obtaining in said heating stage to polymerize said gases in part into compounds having molecular weights of gasoline hydrocarbons, removing the products from said polymerizing stage and again fractionating the same to separate the high-boiling polymer-containing fractions from the desired low-boiling polymer-free fraction.

2. The method of treating cracked low-boiling unsaturated hydrocarbons, which consists in passing such hydrocarbons from a cracking zone through a fractionating stage to separate as vapors a fraction composed of the more volatile hydrocarbons from a less volatile liquid fraction, condensing and collecting the volatile fraction and removing therefrom the uncondensed gaseous hydrocarbons passing the higher boiling less volatile liquid fraction through a heating stage and therein subjecting such liquid fraction to controlled conditions of temperature and pressure to produce without material molecular decomposition thereof polymerization of undesired gum-forming and color-imparting bodies present in said liquid fraction, simultaneously passing through said heating stage a portion, at least, of said gaseous hydrocarbons and subjecting them without material cracking to the controlled conditions of temperature and pressure obtaining in said heating stage to polymerize said gases in part into compounds having molecular weights of gasoline hydrocarbons, maintaining said hydrocarbons passing through the heating stage in intimate contact with a finely divided solid absorbent, removing the products from the polymerizing stage and again fractionating the same to separate the absorbent and a high-boiling polymer containing fraction from a desired low-boiling polymer-free fraction.

3. The method of treating cracked low-boiling unsaturated hydrocarbons, which consists in passing such hydrocarbons from a cracking zone, wherein unsaturated hydrocarbons are produced, directly through a fractionating stage, removing from said fractionating stage the vapors formed by the more volatile of the hydrocarbons fractionated, separately removing from said fractionating stage as a liquid a higher-boiling and less volatile fraction, condensing and collecting the volatile fraction and removing therefrom the uncondensed gaseous hydrocarbons, passing the higher boiling liquid fraction together with said gaseous hydrocarbons through a polymerizing zone wherein said mixture of liquid and gaseous hydrocarbons are subjected to regulated conditions of temperature and pressure to produce without material cracking thereof polymerization reactions, whereby gum-forming and color-imparting bodies present in the liquid fraction are converted into high-boiling point fractions and said gaseous hydrocarbons are polymerized in part into hydrocarbons falling within the boiling range of ordinary gasoline, removing the products from said polymerizing zone and again fractionating the same separating the high-boiling gum-forming and color-imparting polymers from desired low-boiling oils.

4. The method of treating cracked low-boiling unsaturated hydrocarbons, which consists in passing such hydrocarbons from a cracking zone, wherein unsaturated hydrocarbons are produced, directly through a fractionating stage, removing from said fractionating stage the vapors formed by the more volatile of the hydrocarbons fractionated, separately removing from said fractionating stage as a liquid a higher boiling and less volatile fraction, condensing and collecting the volatile fraction and removing therefrom the uncondensed gaseous hydrocarbons, passing the higher boiling liquid fraction together with said gaseous hydrocarbons through a polymerizing zone wherein said mixture of liquid and gaseous hydrocarbons are subjected to regulated conditions of temperature and pressure to produce without material cracking thereof polymerization reactions, whereby gum-forming and color-imparting bodies present in the liquid fraction are converted into high-boiling point fractions and said gaseous hydrocarbons polymerized in part into hydrocarbons falling within the boiling range of ordinary gasoline, maintaining the hydrocarbons within the polymerizing zone in contact with a finely divided adsorbent which passes in unison with the hydrocarbons through the polymerizing zone, removing the products from the polymerizing zones and immediately fractionating the same to separate the high-boiling adsorbent containing fractions from the desired low-boiling fractions.

5. The method of treating cracked low-boiling unsaturated hydrocarbons, which consists in passing such hydrocarbons from a cracking zone wherein such low-boiling unsaturated hydrocarbons are produced through a fractionating stage, withdrawing from one portion of said stage a liquid fraction composed of relatively high-boiling hydrocarbons, from another portion of said stage vapors composed of lower-boiling hydrocarbons, condensing and collecting said lower-boiling hydrocarbons, removing from said lower boiling hydrocarbons those hydrocarbons which remain gaseous at normal temperatures, compressing and fractionating said gaseous hydrocarbons to separate their more readily liquefiable constituents from the remaining olefine-containing gases, passing said latter gases together with the liquid fraction of higher boiling hydrocarbons withdrawn from the fractionating stage through a polymerizing zone, maintaining said hydrocarbons during their passage through the polymerizing zone at non-cracking temperatures varying between 500° F. and 900° F. while maintaining the same under high pressure, and fractionating the products discharged from the polymerizing zone to separate undesired high-boiling compounds from the desired low-boiling compounds.

6. The method of treating cracked low-boiling unsaturated hydrocarbons, which consists in passing such hydrocarbons from a cracking zone wherein such low-boiling unsaturated hydrocarbons are produced through a fractionating stage, withdrawing from one portion of said stage a liquid fraction composed of relatively high-boiling hydrocarbons, from another portion of said stage vapors composed of lower-boiling hydrocarbons, condensing and collecting said lower-boiling hydrocarbons, removing from said lower-boiling hydrocarbons those hydrocarbons which remain gaseous at normal temperatures, compressing and fractionating said gaseous hydrocarbons to separate their more readily liquefiable constituents from the remaining olefine-containing gases, passing said latter gases together with the liquid fraction of higher boiling hydrocarbons withdrawn from the fractionating stage through a polymerizing zone, maintaining said hydrocarbons during their passage through the polymerizing zone at non-cracking temperatures varying between 500° F. and 900° F. while maintained under high pressure, maintaining said hydrocarbons during their passage through the polymerizing zone in contact with the finely divided solid adsorbent, and fractionating the products discharged from the polymerizing zone to separate undesired high-boiling compounds from the desired low-boiling compounds.

In testimony whereof I affix my signature.
RUDOLPH C. OSTERSTROM.